United States Patent [19]

Obushenko

[11] Patent Number: 5,512,390
[45] Date of Patent: Apr. 30, 1996

[54] LIGHT-WEIGHT ELECTRICAL-STORAGE BATTERY

[75] Inventor: Ivan M. Obushenko, Kiev, Ukraine

[73] Assignee: Photran Corporation, Lakeville, Minn.

[21] Appl. No.: 278,387

[22] Filed: Jul. 21, 1994

[51] Int. Cl.[6] ................................. H01M 10; H01M 18
[52] U.S. Cl. ..................... 429/204; 429/205; 429/210; 429/224; 429/225
[58] Field of Search ........................ 429/152, 204, 429/205, 210, 224, 225

[56] References Cited

U.S. PATENT DOCUMENTS

| | | | |
|---|---|---|---|
| 246,953 | 9/1881 | Howell | 429/205 X |
| 1,305,251 | 3/1919 | Burgess | 429/229 X |
| 4,079,174 | 3/1978 | Beck et al. | 429/209 X |
| 4,193,216 | 3/1979 | Hradcovsky et al. | 429/204 |
| 5,395,709 | 3/1995 | Bowker et al. | 429/152 |

FOREIGN PATENT DOCUMENTS

| | | |
|---|---|---|
| 1033650 | 7/1953 | France. |
| 56-45571 | 4/1981 | Japan. |

*Primary Examiner*—Stephen Kalafut
*Attorney, Agent, or Firm*—R. Russel Austin

[57] ABSTRACT

An electrical-storage battery includes a cell defined by two spaced-apart graphite electrode-plates one of which forms a cathode and the other an anode. The cell contains an electrolyte which is an aqueous solution including sulfuric acid. In a charged condition, the electrode-plate which forms a cathode has a surface layer of lead in contact with the electrolyte, and the electrode-plate which forms the anode has a surface layer of manganese dioxide in contact with the electrolyte. In a battery having multiple cells arranged in electrical series, a single graphite electrode-plate physically separates adjacent cells, but electrically connects the cells. This electrode-plate serves as a cathode for one of the adjacent cells, and as an anode for the other.

9 Claims, 2 Drawing Sheets

LIGHT-WEIGHT ELECTRICAL-STORAGE BATTERY

BACKGROUND OF THE INVENTION

The present invention relates generally to storage batteries including aqueous electrolyte. It relates in particular to a battery wherein working masses are lead and manganese dioxide and the electrolyte is an aqueous solution including sulfuric acid, and wherein electrode-plates are formed from graphite.

A significant obstacle to the introduction of electric powered vehicles is the availability of suitable batteries at an acceptable cost. At present, conventional lead-acid batteries are most extensively used in electric powered vehicles. While other battery types such as nickel-zinc (Ni/Zn), nickel-iron (Ni/Fe), sodium-sulfur, (Na/S), aluminum-air (Al/Air), zinc-bromine Zn/Br, and lithium-iron sulfide (LiAl—FeS), are under development as a lighter, more efficient alternative to the lead-acid battery, they are still not widely accepted. This is due to a combination of factors including cost of materials, and complexity and cost of construction.

Desirable characteristics of a battery for electric vehicles include lightness, rapid charging rate, performance at low charge, ability to be charged and discharged many times without deterioration, and calendar lifetime. In addition, of course, the battery must have a high storage capacity per unit weight and should be capable of delivering high power over short periods to provide acceptable acceleration.

In a French Patent No 1,033,650 (Billioque), a battery is described which employs an electrolyte of copper sulphate and lead electrode-plates. The battery is constructed from an electrical series of physically isolated cells, wherein adjacent cells are physically isolated from each other by one of the electrode-plates. This electrode plate serves as a negative electrode for one of the adjacent cells, and as a positive electrode for the other. When the battery is charged, a layer of copper is deposited on one lead electrode-plate which is acting as a cathode, and oxygen is released from the electrolyte. The oxygen reacts with an adjacent lead electrode-plate, which is acting as an anode, to form a layer of lead oxide thereon.

It is taught in Billioque that an advantage of this cell construction is a relatively high charging rate compared with conventional lead-acid batteries. It is taught that it can be completely charged in less than one-quarter hour, while a conventional lead-acid battery requires several hours to completely charge. It is also taught that the battery can fully discharged in less that one-quarter hour, and that it is lighter in weight than a comparable lead-acid battery.

Despite the above described advantages, however, the battery of Billioque still requires lead electrode-plates which add significantly to the weight of the battery. Any electrode plate serving as an anode is corroded by the electrolyte. It is corrosion of electrode-plates by the electrolyte which is a significant factor leading to a limitation of the number of available charging cycles and of calendar lifetime in a conventional lead-acid battery, and presumably also in the battery of Billioque.

SUMMARY OF THE INVENTION

The present invention is directed to providing an aqueous acid-electrolyte electrical-storage battery, which is lighter in weight than a conventional lead acid battery and may have a longer lifetime than a conventional lead acid battery. In one aspect of the present invention, the battery comprises first and second graphite electrode-plates, each thereof having first and second surfaces. The electrode-plates are spaced apart with the second surface of the first electrode-plate facing the first surface of the second electrode-plate. Thus arranged, the electrode-plates define an electrolyte space therebetween.

The electrolyte space contains an electrolyte. The electrolyte is an aqueous solution including sulfuric acid. When the battery is charged, the second surface of the first electrode-plate has a layer of lead (Pb) thereon, and the first surface of the second electrode has a layer of manganese dioxide ($MnO_2$) thereon. When the battery is subsequently discharged, the lead layer is at least partially transformed into a lead sulfate ($PbSO_4$) layer and the manganese dioxide layer at least partially dissolves in the electrolyte.

In one preferred embodiment of the present invention, a storage battery comprises a series of spaced-apart, generally parallel, graphite electrode-plates. The electrode-plates are designated the first through the Nth in consecutive numerical order, where N is the total number of electrode-plates. Each of the electrode-plates has first and second opposite surfaces. The electrode-plates are arranged such that the first and second surfaces of adjacent electrode-plates face each other.

The electrode-plates define an electrical series of N–1 cells, each thereof containing an electrolyte. Adjacent ones of the cells are in electrical contact with each other via a corresponding one of the electrode-plates. The cells are in fluid isolation from each other.

The electrolyte is an aqueous solution including sulfuric acid. When the battery is charged, each of the second surfaces of the first through the (N–1)th electrode-plates have a layer of lead thereon, and each of the first surfaces of the second through the Nth electrode-plates have a layer of manganese dioxide thereon. When the battery is subsequently discharged, the lead layers are at least partially transformed into lead sulfate layers and the manganese dioxide layers at least partially dissolve in the electrolyte.

The first surface of the first electrode-plate and the second surface of the Nth electrode-plate include respectively first and second contacts for making electrical connection with the battery. The first contact forms a positive terminal for the battery, and the second contact forms a negative terminal for the battery.

The battery has several advantageous features. For example, graphite plates replace the lead electrode-plates of the conventional lead-acid battery. The graphite plates may serve as both positive and negative electrodes. This results in considerable weight savings compared with the conventional lead-acid battery. It is estimated that battery in accordance with the present invention may have a weight less than about two-thirds that of a conventional lead-acid battery and occupy a volume less than about two-thirds that of a conventional lead-acid battery.

In a conventional lead-acid battery, the electrode-plates, in particular the anode plates, chemically react the acid electrolyte. This leads to eventual destruction of the electrodes, and thus destruction of the battery. In a battery in accordance with the present invention, the graphite electrode-plates do not react with the electrolyte. It is estimated that a battery in accordance with the present invention will have a lifetime about fifty percent longer than that of a conventional lead-acid battery.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the invention.

DETAILED DESCRIPTION OF THE INVENTION

Figure 1:
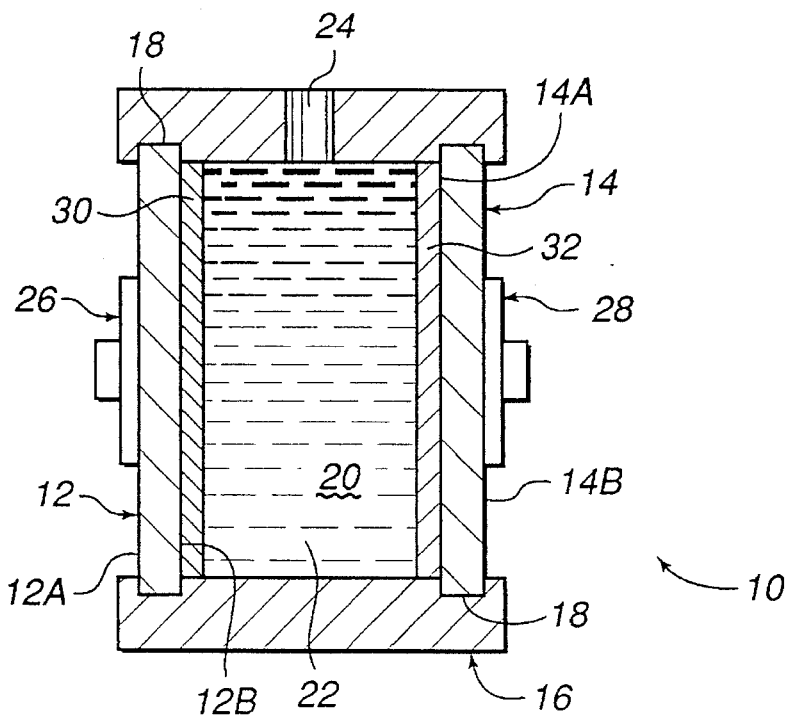
FIG. 1 is a general cross-section view schematically illustrating a single-cell battery in accordance with the present invention.

Turning now to the drawings, wherein like components are designated by like reference numerals, FIG. 1 shows one preferred construction 10 of a single-cell electrical-storage battery in accordance with the present invention. A cell 10 is formed from two spaced-apart graphite electrode-plates 12 and 14. Plates 12 and 14 have first and second opposite surfaces 12A and 14A, and 12B and 14B respectively, here numbered arbitrarily, for descriptive purposes, from left to right.

Electrode-plates 12 and 14 are spaced apart by a spacer 16 of an insulating material, for example, ebonite, polyethylene or polypropylene. The electrode-plates are located in recesses 18 in spacer 16 and bonded in the recesses, in a fluid-tight manner, by a corrosion proof adhesive such as an epoxide adhesive. Spacer 16, shown in FIG. 1 in cross-section, may have any practical cross-section. Spacer 16 may have, for example, a rectangular or cylindrical cross-section, with electrode-plates 12 and 14 having a corresponding rectangular or circular shape. An electrolyte space 20 is defined by electrode-plates 12 and 14. The electrolyte space is filled with an electrolyte 22. Electrolyte 22 is thus in contact with surfaces 12B and 14A of the electrode-plates. Spacer 16 includes a port 24 for adding electrolyte 22 into electrolyte space 20. Port 24 may be closed with any suitable stopper (not shown) formed from a corrosion resistant material. Metal contacts 26 and 28, for example, of copper (Cu) or lead (Pb), are bonded to first surface 12A of electrode-plate 12 and second surface 14B of electrode-plate 14 respectively. In cell 10, second surface 12B of electrode-plate 12 forms a anode or positive pole, and first surface 14A of electrode-plate 14 forms an cathode or negative pole. Contacts 26 and 28 provide respectively positive and negative terminals.

A preferred electrochemical scheme for cell 10 has working masses of lead and manganese dioxide (layers 30 and 32 discussed above) and an electrolyte which is an aqueous solution including sulfuric acid. The electrochemical scheme may be expressed as:

for which electrolyte 22 is an aqueous solution including sulfuric acid and chemical reactions on charge and discharge of cell 10 proceed as follows:

At the anode:

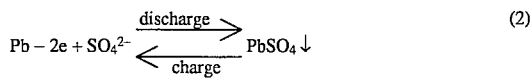

At the cathode:

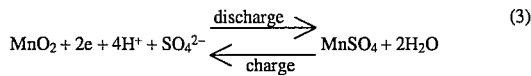

From a standard electrochemical potential table, it is calculated that cell 10 may have an EMF of about 1.586 Volts (V) using the electrochemical scheme of equation (1).

In practice, equations (2) and (3) represent that when cell 10 is charged, second surface 12B of electrode-plate 12 has a layer 30 of lead thereon and first surface 14A of electrode-plate 14 has a layer 32 of $MnO_2$ thereon. When cell 10 is discharged the Pb layer is at least partially transformed into a layer of insoluble lead sulfate and the $MnO_2$ layer at least partially dissolves in the electrolyte forming $MnSO_4$ therein. Because of this, when a battery in accordance with the present invention is partially or fully discharged electrolyte 22 will include manganese sulfate in addition to sulfuric acid.

Figure 2:
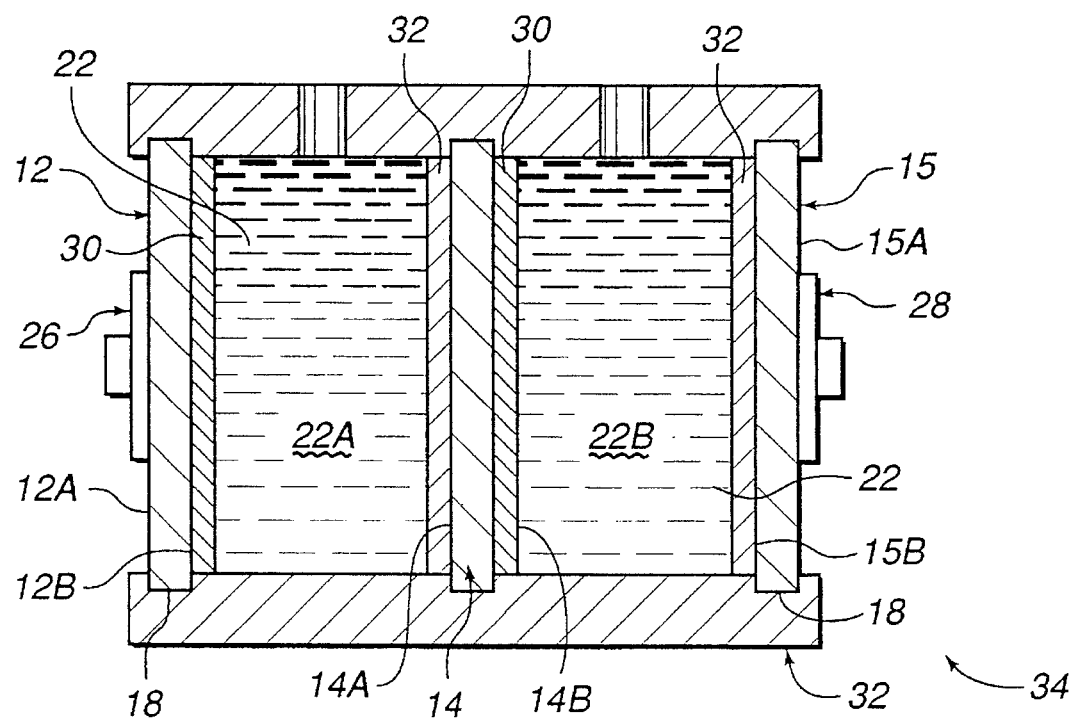
FIG. 2 is a general cross-section view schematically illustrating a double-cell battery in accordance with the present invention.

Referring now to FIG. 2, a two-cell electrical-storage battery 34 includes first, second, and third, spaced-apart, generally parallel, graphite electrode-plates 12, 14, and 15 respectively. Each of the electrode-plates has first and second opposite surfaces. These surfaces are designated in FIG. 2 by reference numerals 12A, 12B, 14A, 14B, 15A, and 15B in order, reading, for purposes of this description, from left to right. The surfaces are thus arranged such that the first and second surfaces of adjacent electrode-plates face each other.

The first and second, and the second and third electrode-plates define, respectively, first and second cells or electrolyte-spaces 22A and 22B. Each of the cells contains an electrolyte 22. It is important that the cells are in fluid isolation from each other, i.e., the cells are fluid-tight. This may be achieved by providing a spacer element 32, similar to spacer element 16 described above. The spacer element 32 is provided with recesses 18 for receiving the electrode-plates, which are secured in a fluid tight manner in the recesses. The first and second cells are in electrical series contact with each other via second electrode-plate 14. As such, electrode-plate 14 serves both as an cathode for cell 22A and a anode for cell 22B. Contact 26 on first surface 12A of electrode-plate 12 forms a positive terminal for battery 34. Contact 28 on second surface 15B of electrode-plate 15 forms a negative terminal for battery 34.

When battery 34 is charged, second surfaces 12B and 14B of electrode-plates 12, and 14 respectively have a layer 30 of lead thereon, and first surfaces 14A and 15A of electrode-plates 14 and 15 respectively have a layer 32 of $MnO_2$ thereon.

Figure 3:
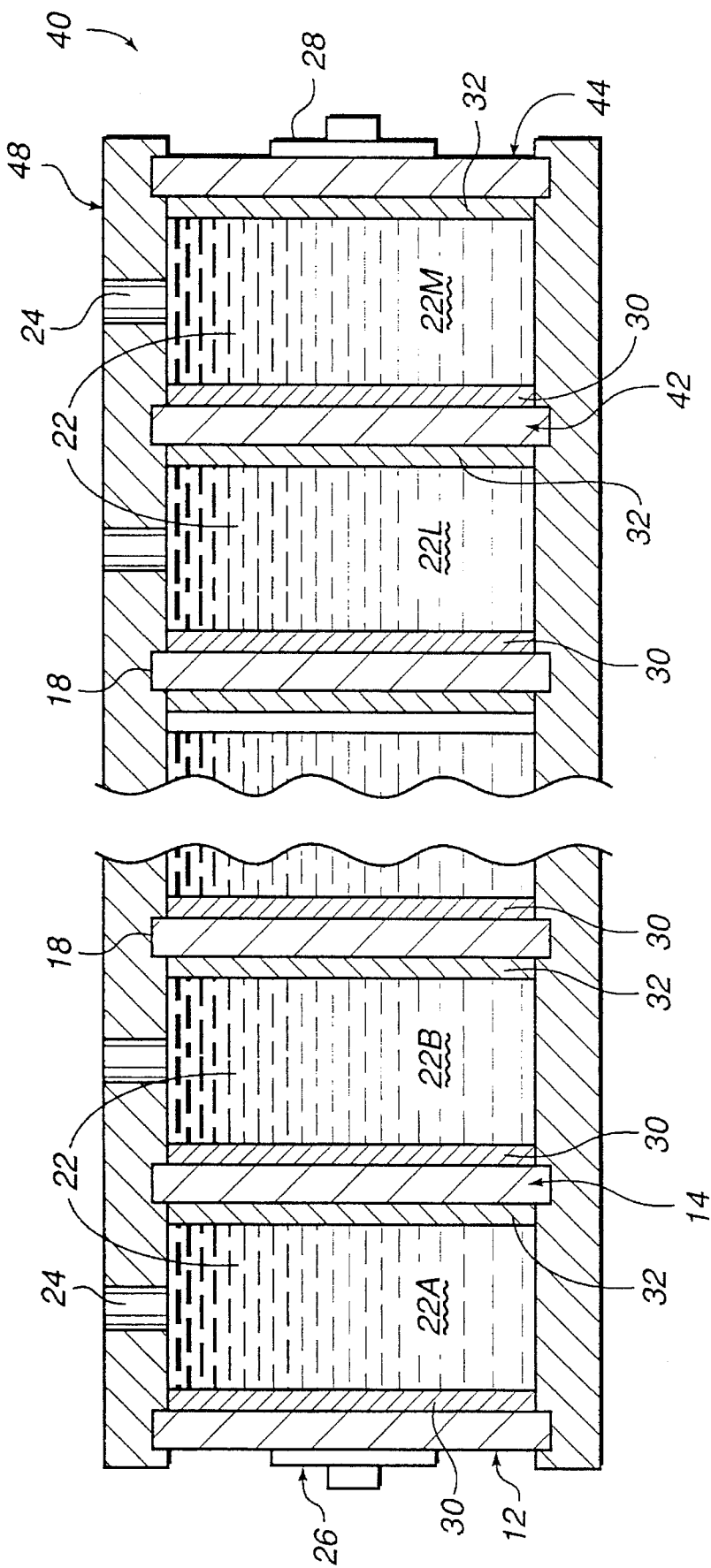
FIG. 3 is a general cross-section view schematically illustrating a preferred embodiment of a battery in accordance with the present invention, including a plurality of cells in electrical series.

In theory at least, a battery may be formed from any number of cells arranged in electrical series, the number depending on the EMF of each cell and the battery voltage desired. Referring now to FIG. 3, a battery 40 is illustrated which includes a number N of generally parallel spaced-apart, graphite electrode-plates. Only first and second electrode-plates, 12 and 14 respectively, and (N–1)th and Nth electrode-plates, 42 and 44, respectively are specifically identified. Each of the plates has first and second opposite surfaces numbered in FIG. 3, in order, from left to right for purposes of this description. The plates are arranged with first and second opposite surfaces of adjacent plates facing each other.

The electrode-plates define an electrical series of N–1 cells or electrolyte spaces, of which only a first two 22A and 22B, and a last two 22L and 22M are specifically identified in FIG. 3. Each of the cells contains an electrolyte 22, according to the electrochemical scheme of equation (1). Adjacent cells are in fluid isolation from each other and are in electrical contact with each other via a corresponding one of the electrode-plates. All but first and Nth electrode-plates 12 and 44, respectively, act as an cathode for one cell and a anode for an adjacent cell.

When storage battery 40 is charged, second surfaces of the first through the (N–1)th electrode-plates (serving as anodes) have a layer 30 of lead thereon, and first surfaces of the second through the Nth electrode-plates, (serving as anodes) have a layer 32 of $MnO_2$ thereon. Contact 26 on first surface 12A of electrode-plate 12 forms a positive terminal for battery 40, while contact 28 on first second surface 44B of Nth electrode-plate 44 forms a negative terminal for battery 40. As described above, the electrode-plates of battery 40 are spaced apart by a rectangular or circular section spacer, here spacer 48, which includes recesses 18 for receiving the electrode-plates. Ports 24 are provided for filling the cells of battery 40 with electrolyte 22.

Using the electrochemical scheme of equation (1), a 12 V automobile battery constructed in accordance with FIG. 3 would require a total of eight cells formed by nine electrode-plates. In such a battery, spacer 48 preferably has a rectangular cross-section, preferably between about 15 and 25 centimeters (cm) high and between about 15 and 25 cm wide. Electrode-plates in the battery are preferably spaced apart by between about 1.0 and 2.5 cm. In such a battery, a preferred thickness for a graphite electrode-plate would be between about 1.0 and 5.0 millimeters (mm).

Continuing now with a discussion of certain practical aspects of battery fabrication, in the above described batteries layer or layers 30 of lead and layer or layers 32 of manganese dioxide provide the active masses of the battery. These layers are preferably applied to the graphite electrode plates when the battery is initially fabricated. The layers are may be deposited by any convenient layer deposition method, such as electro-deposition or sputtering, the latter being preferred.

Electro-deposition of layers 30 and 32 may be carried out conveniently in a newly constructed battery with the graphite electrode plates already installed. It is preferable that layers 30 and 32 are deposited separately, with layer 30 being deposited first. Cells should be rinsed with deionized water between deposition of the two layers.

One preferable electrolyte for the electro-deposition of layer 30 is a solution of lead nitrates $Pb(NO_3)_2$ containing about 100.0 g of $Pb(NO_3)_2$ per 600 milliliters (ml) of water. A preferable electrolyte for deposition layer 32 is a solution of manganese nitrate $(Mn(NO_3)_2 \cdot 6H_2O)$ containing about 120.0 grams (g) of $Mn(NO_3)_2 \cdot 6H_2O$ per 600 ml of water. In cells of practical dimensions, three complete charges of the appropriate solution may be required to deposit sufficient active mass of Pb and $MnO_2$.

TABLE 1

| Type of Battery | Pb—$MnO_2$ | Cu—$PbO_2$ | Pb—$PbO_2$ |
|---|---|---|---|
| EMF of Unit Cell (V) | 1.586 | 1.348 | 2.041 |
| Cells for >12 V EMF | 8 | 9 | 6 |
| Min Active Mass (Kg) | 2.352 | 2.727 | 2.676 |
| Min Mass of Charged Electrode Plates (Kg) | 4.78 | 7.27 | 10* |
| Soluble Salts formed per Unit Cell (Kg) | $MnSO_4$ 0.151 | $CuSO_4$ 0.160 | None Formed |
| Solubility of Salts | 63.0 | 20.2 | — |

TABLE 1-continued

| Type of Battery | Pb—$MnO_2$ | Cu—$PbO_2$ | Pb—$PbO_2$ |
|---|---|---|---|
| (g per 100 g water) | | | |
| Least Required Electrolyte Vol (1) | 1.92 | 7.20 | 3.8 |
| Mass of Battery (Kg) | 7.2/11.0 | 16.5 | 14.9 |
| Volume of Battery (1) | 2.0/5.0 | 10.0 | 7.5 |

It has been determined that deposition of lead layer 30 is improved by adding to the electro-deposition solution a relatively small amount of a soluble copper salt such as copper nitrate $(Cu(NO_3)_2)$. In the electro-deposition process, copper plating will be initiated before lead plating, thus forming a type of nucleating layer on the graphite electrode plate, on which lead layer 30 subsequently forms. This results in a more uniform and adherent lead layer. It has also been determined that adhesion of manganese dioxide layer 32 to the graphite electrode plate may be improved when the electro-deposition solution is at a temperature of about 45° C. The solution may be raised to such a temperature by passing a sufficiently high current during electro-deposition.

Once the required active masses are deposited as layers 30 and 32, electro-deposition solution is removed from the battery and working electrolyte 22 is introduced into the battery. This electrolyte is preferably a solution of about 37.5% by weight sulfuric acid in water. Those skilled in the art to which the present invention pertains will recognize that even if electrolyte introduced initially into the battery includes only sulfuric acid in solution it will shortly thereafter include traces of manganese sulfate resulting from self discharge processes in the battery, and at any time thereafter will include manganese sulfate in proportion to the state of discharge of the battery, including trace quantities of manganese sulfate even when the battery is nominally fully charged.

Referring now to Table 1, estimated parameters of a battery in accordance with the present invention are compared with the same parameters of the battery of Billioque and a conventional lead-acid battery. In Table 1 the battery types are referred to by their active mass constituents in charged condition. The battery of the present invention is referred to as a Pb-$MnO_2$ battery; the battery of Billioque is referred to as a Cu-$PbO_2$ battery; and the conventional lead-acid battery is referred to as a Pb-$PbO_2$ battery. The parameters of Table 1 are parameters estimated for battery having a capacity of 53.6 Ampère.Hours (AH) and electrode plates having an area of about 400 square centimeters ($cm^2$). The EMF of unit cells was calculated from standard tabulated EMF data.

The minimum active masses are calculated according to Faraday's law, which states that 26.8 AH of electricity are produced when one gram-equivalent of each of the cathodic and anodic active masses chemically react. Selection of 53.6 AH for comparison provides a capacity which is within a range common for automobile batteries, and simplifies calculations. The minimum mass of charged electrode plates is equal to the minimum mass of active masses plus the weight of the electrode plates supporting the active masses. For the Cu-$PbO_2$ battery which employs lead plates, a plate thickness of 1 mm is assumed. Graphite plates of the battery of the present invention are assumed to have a thickness of 3 mm.

In any battery, weight of an electrolyte provides a significant contribution to total battery weight or mass, and is thus an important factor in determining the amount of electrolyte required for a particular battery. For the Pb- $MnO_2$ battery of the present invention, and the $Cu$-$PbO_2$ of Billioque, wherein one of the active mass constituents dissolves in the electrolyte during discharge, a minimum volume of electrolyte is determined by that volume of electrolyte which is necessary to dissolve soluble salts formed by transformation of the active masses on discharge. In the battery of Billioque soluble copper sulfate ($CuSO_4$) is produced on discharge. In the battery of the present invention, manganese sulfate ($MnSO_4$) is produced on discharge. It should be kept in mind, however, that this simple determination of a minimum amount of electrolyte yields an amount which would provide a saturated solution on complete discharge. This would slow the discharge process as saturation was approached, thereby reducing a battery's ability to respond to power surge demands in proportion to its state of discharge. Accordingly, in the battery of the present invention, it is preferable to include sufficient electrolyte, in excess of the solubility-determined minimum shown in Table 1, to provide about three moles of $H_2SO_4$ per unit cell. This would require an electrolyte volume of about 0.6 l per unit cell or a total of 4.8 l for the eight-cell battery of Table 1. It should be noted that for the $Pb$-$PbO_2$ battery of Table 1, those values marked by an asterisk are not estimated or calculated values, but actual values determined from descriptive data on an actual 55.0 AH lead-acid battery.

The minimum mass and volume of the battery in accordance with the present invention of Table 1 are estimated based on an electrolyte volume determined by solubility of $MnSO_4$ alone. The maximum mass and volume of the battery of the present invention as shown in Table 1 are estimated on the assumption that a unit cell volume is 0.6 l. The estimated mass and volume of the $Cu$-$PbO_2$ battery of Billioque are based on a solubility-determined electrolyte volume, and an electrode plate thickness of about 1.00 mm. Practically the mass and volume may be considerably greater.

From consideration of Table 1 it can be seen that the above-discussed prior art battery of Billioque, while having a simpler construction than a conventional lead-acid battery may, at best, not have any advantage over a conventional lead-acid battery as regards mass and volume, both are which are of importance for automotive batteries. It can be seen that, compared in the manner of Table 1, the simpler construction scheme of the battery of Billioque is offset by a requirement for more unit cells to provide a 12 V potential, and by a minimum volume of electrolyte which is about 3.5 liters greater than is typical for a conventional lead acid battery.

A corresponding battery in accordance with the present invention requires, at most, a volume of electrolyte only 1.0 liters greater than the corresponding conventional lead-acid battery, but provides weight savings, due to a savings in mass of charged electrode plates of more than 5 Kilograms (Kg). This weight savings is due to a lower mass of active masses, and, in particular, to the use of graphite electrode plates. The battery of the present invention also has, even at maximum estimated volume, a lower overall volume than the conventional lead acid battery.

Another advantageous feature of a battery constructed in accordance with the present invention is that the graphite electrode-plates are not corroded by the electrolyte. The plates merely act as a host for the active masses of the battery. The graphite plates are not corroded by sulfuric acid. Accordingly a battery in accordance with the present invention may undergo more than three-thousand charge/discharge cycles without deterioration, and may have a calendar lifetime in excess of seven years. A conventional lead-acid battery for automotive use may be expected to deteriorate after between about 1200 and 2000 charge/discharge cycles, and have a calendar lifetime between about three and five years.

The present invention has been described and depicted in terms of a preferred and other embodiments. The invention, however, is not limited to the embodiments described and depicted. Rather, the invention is limited only by the claims appended hereto.

What is claimed is:

1. An electrical-storage battery, comprising:

first and second graphite electrode-plates, each thereof having first and second surfaces, said electrode-plates spaced apart with said second surface of said first electrode-plate facing said first surface of said second electrode-plate and said electrode-plates defining an electrolyte space therebetween;

said electrolyte space containing an electrolyte, said electrolyte being an aqueous solution including sulfuric acid; and said second surface of said first electrode-plate forming an anode and having a layer of lead thereon when the battery is fully charged and said first surface of said second electrode forming a cathode and having a layer of manganese dioxide thereon when the battery is fully charged, whereby when said battery is discharged, said layer of lead transforms at least partially into a layer of lead sulfate and said layer of manganese dioxide at least partially dissolves in said electrolyte.

2. The battery of claim 1, wherein said first surface of said first electrode-plate and said second surface of said second electrode-plate include respectively first and second contact means for making electrical connection with the battery, said first contact means forming a positive terminal for the battery and said second contact means forming a negative terminal for the battery.

3. The battery of claim 1, wherein said electrolyte further includes manganese sulfate.

4. An electrical-storage battery, comprising:

first second and third, spaced-apart, generally parallel, graphite electrode-plates, each of said electrode-plates having first and second opposite surfaces, and arranged such that the first and second surfaces of adjacent plates face each other;

said first and second and said second and third electrode-plates defining respectively first and second cells, said cells in fluid isolation from each other and each thereof containing an electrolyte, said electrolyte being an aqueous solution including sulfuric acid;

said first and second cells in electrical series contact with each other via said second electrode-plate; and said second surfaces of said first and second electrode-plates each forming anode and each having a layer of lead thereon when the battery is fully charged, and said first surfaces of said second and third electrode-plates each forming a cathode and each having a layer of manganese dioxide thereon when the battery is fully charged, whereby when the battery discharged, said lead layers are transformed at least partially into lead sulfate layers and said manganese dioxide layers at least partially dissolve in said electrolyte.

5. The battery of claim 4, wherein said electrolyte further includes manganese sulfate.

6. The battery of claim 4, wherein said first surface of said first electrode-plate and said second surface of said third electrode-plate include respectively first and second contact means for making electrical connection with the battery, said first contact means forming a positive terminal for the battery and said second contact means forming a negative terminal for the battery.

7. An electrical-storage battery, comprising:

a series of spaced-apart, generally parallel, graphite electrode-plates, said electrode-plates designated the first through the Nth in consecutive numerical order, where N is the total number of said electrode-plates, each of said electrode-plates having first and second opposite surfaces, and arranged such that the first and second surfaces of adjacent electrode-plates face each other;

said electrode-plates defining an electrical series of N–1 cells, each thereof containing an electrolyte, and with adjacent ones thereof in fluid isolation from each other and in electrical contact with each other via a corresponding one of said electrode-plates;

said electrolyte being an aqueous solution including sulfuric acid; and each of said second surfaces of the first through the (N–1)th electrode-plates forming an anode and having a layer of lead thereon when the battery is charged, and each of said first surfaces of the second through the Nth electrode-plates forming a cathode and having a layer of manganese dioxide thereon when the battery is charged, whereby when said battery is discharged said layers of lead transform at least partially into layers of lead sulfate layers and said manganese dioxide layers dissolve at least partially in said electrolyte.

8. The battery of claim 7, wherein said first surface of said first electrode-plate and said second surface of said Nth electrode-plate include respectively first and second contact means for making electrical connection with the battery, said first contact means forming a positive terminal for the battery and said second contact means forming a positive terminal for the battery.

9. The battery of claim 7, wherein said electrolyte further includes manganese sulfate.

* * * * *